United States Patent
La Forest et al.

(10) Patent No.: US 9,550,701 B2
(45) Date of Patent: Jan. 24, 2017

(54) CARBON-CARBON COMPOSITES INCLUDING ISOTROPIC CARBON ENCAPSULATING LAYER AND METHODS OF FORMING THE SAME

(71) Applicant: Honeywell International Inc., Morristown, NJ (US)

(72) Inventors: Mark L. La Forest, Granger, IN (US); Slawomir T. Fryska, Granger, IN (US); Ryan Bourlier, Elkhart, IN (US); Mark Behnke, South Bend, IN (US)

(73) Assignee: Honeywell International Inc., Morris Plains, NJ (US)

( * ) Notice: Subject to any disclaimer, the term of this patent is extended or adjusted under 35 U.S.C. 154(b) by 551 days.

(21) Appl. No.: 13/951,275

(22) Filed: Jul. 25, 2013

(65) Prior Publication Data

US 2015/0031522 A1    Jan. 29, 2015

(51) Int. Cl.
 *C04B 35/52*    (2006.01)
 *C04B 35/83*    (2006.01)

(52) U.S. Cl.
 CPC .............. *C04B 35/521* (2013.01); *C04B 35/83* (2013.01); *C04B 2235/48* (2013.01); *C04B 2235/616* (2013.01)

(58) Field of Classification Search
 CPC .................................................. C04B 35/521
 See application file for complete search history.

(56) References Cited

U.S. PATENT DOCUMENTS

| | | |
|---|---|---|
| 3,927,186 A | 12/1975 | Vinton et al. |
| 6,342,171 B1 | 1/2002 | Murdie et al. |
| 6,537,470 B1 | 3/2003 | Wood et al. |
| 6,686,083 B1 | 2/2004 | Saito et al. |
| 6,939,490 B2 | 9/2005 | La Forest et al. |
| 7,172,408 B2 | 2/2007 | Wood et al. |
| 7,727,448 B2 | 6/2010 | Boutefeu et al. |
| 2003/0111752 A1 | 6/2003 | Wood et al. |
| 2004/0164451 A1 | 8/2004 | Mortimer et al. |
| 2005/0051394 A1* | 3/2005 | Huang ................... B82Y 30/00 188/251 A |

(Continued)

FOREIGN PATENT DOCUMENTS

| | | |
|---|---|---|
| CN | 101489957 A | 7/2009 |
| EP | 0251596 A1 | 6/1987 |

(Continued)

OTHER PUBLICATIONS

Amendment in Response to Final Office Action mailed Jan. 2, 2015, from U.S. Appl. No. 13/117,711, filed Apr. 2, 2015, 8 pp.

(Continued)

*Primary Examiner* — Larry Thrower
(74) *Attorney, Agent, or Firm* — Shumaker & Sieffert, P.A.

(57) ABSTRACT

A technique of forming a carbon-carbon composite material includes infusing a liquid carbonizable precursor into a porous preform, and the infused precursor is subsequently pyrolyzed to convert the precursor to isotropic carbon. The preform then can be densified with a densifying agent, followed by infusion of the liquid carbonizable precursor into the densified preform. In some examples, after pyrolyzing the liquid carbonizable precursor, isotropic carbon extends substantially throughout a volume of the carbon-carbon composite material.

14 Claims, 3 Drawing Sheets

(56) References Cited

U.S. PATENT DOCUMENTS

| | | |
|---|---|---|
| 2005/0164578 A1 | 7/2005 | LoFaro et al. |
| 2006/0177663 A1 | 8/2006 | Simpson et al. |
| 2006/0244165 A1 | 11/2006 | Huang |
| 2009/0200700 A1 | 8/2009 | Marlin et al. |
| 2010/0129551 A1 | 5/2010 | Fryska et al. |
| 2011/0110787 A1 | 5/2011 | Belmonte et al. |
| 2011/0124253 A1 | 5/2011 | Shah et al. |
| 2012/0302117 A1* | 11/2012 | Forest ............... C04B 35/83 442/59 |

FOREIGN PATENT DOCUMENTS

| | | |
|---|---|---|
| EP | 0601808 A1 | 6/1994 |
| EP | 2570385 A2 | 5/2006 |
| EP | 2527129 A1 | 11/2012 |
| GB | 1485528 | 9/1977 |
| GB | 1485529 | 9/1977 |
| WO | 2004050319 A1 | 6/2004 |
| WO | 2007086909 A2 | 8/2007 |

OTHER PUBLICATIONS

Notice of Allowance from U.S. Appl. No. 13/117,711, mailed May 8, 2015, 7 pp.

Translation of Zengmin et al., "Section 2.1: Raw Materials and Section 3.1: Study on molding process," Study on Manufacture of C/C Composites by Molding Process, New Carbon Materials, vol. 14, No. 3, Sep. 30, 1990, 3 pp.

Translation of Lingjun et al., "Section 3: Microstructure of short fiber reinforced C/C composites," Study on Short Carbon Fiber Reinforced C/C Composites Fabricated with Molding Technique, Aerospace Materials and Technology, Issue 6, Dec. 31, 2004, 2 pp.

Cho et al., "Effect of Resin Impregnation Methods at the Early Stage of Densification on the Impregnation Efficiency, Microstructure, and Thermal Stability of Carbon-Carbon Composites," Journal of Applied Polymer Science, vol. 85, Apr. 2002, pp. 183-192.

Prosecution History from U.S. Appl. No. 13/117,711, dated Aug. 3, 2012 through Jan. 2, 2015, 80 pp.

Extended Search Report from Counterpart European Patent Application No. 14177324.2, dated Nov. 18, 2014, 6 pp.

Kumar, et al., "Compression-moulded flax fabric-reinforced polyfurfuryl alcohol bio-composites," Journal of Thermal Analysis and Calorimetry, Aug. 27, 2012, 6 pp.

Kumar, "Thermal properties of polyfurfuryl alcohol absorbed/adsorbed on arylated soy protein films," Journal of Thermal Analysis and Calorimetry, vol. 107, Issue 3, Mar. 2012, pp. 1287-1292 (Published online: Nov. 24, 2011).

Toriz, et al., "Novel Cellulose Ester-Poly(Furfuryl Alcohol)-Flax Fiber Biocomposites," Journal of Applied Polymer Science, vol. 88, Issue 2, Apr. 2003, pp. 337-345.

Guigo, et al., "Eco-friendly composite resins based on renewable biomass resources: Polyfurfuryl alsohol/lignin thermosets," European Polymer Journal, vol. 46, Issue 5, May 2010, pp. 1016-1023 (Available online: Feb. 18, 2010).

European Search Report from EP Application No. 12167950.0, mailed Aug. 21, 2012, 4 pages.

Examination Report dated Sep. 19, 2012, for EP Application No. 12 167 950.0, 12 pages.

Response to Examination Report dated Sep. 19, 2012, from EP Application No. 12 167 950.0, filed Jan. 23, 2013, 12 pages.

Restriction Requirement from U.S. Appl. No. 13/117,711, dated Aug. 3, 2012, 6 pp.

Response to Restriction Requirment dated Aug. 3, 2012, from U.S. Appl. No. 13/117,711, filed Aug. 29, 2012, 1 pp.

Office Action from U.S. Appl. No. 13/117,711, dated Mar. 6, 2013, 7 pp.

Response to Office Action dated Mar. 6, 2013, from U.S. Appl. No. 13/117,711, filed Jun. 5, 2013, 9 pp.

Response to Extended Search Report dated Nov. 18, 2014, from counterpart European Patent Application No. 14177324.2, filed Mar. 23, 2015, 14 pp.

\* cited by examiner

CARBON-CARBON COMPOSITES INCLUDING ISOTROPIC CARBON ENCAPSULATING LAYER AND METHODS OF FORMING THE SAME

TECHNICAL FIELD

The present disclosure is directed to a carbon-carbon composite materials and techniques for forming carbon-carbon composite materials.

BACKGROUND

Some carbon-carbon composite bodies, such as some carbon-carbon composite brake discs that are used in the aerospace industry, may be manufactured from porous preforms. The preforms may be densified using one of several processes, such as chemical vapor deposition/chemical vapor infiltration (CVD/CVI), vacuum/pressure infiltration (VPI), high pressure impregnation/carbonization (PIC), or resin transfer molding (RTM), which may apply carbon within the porous preform.

SUMMARY

The present disclosure describes carbon-carbon composite materials and techniques for forming carbon-carbon composite materials. In some examples, the carbon-carbon composite materials may include carbon fibers and a carbon matrix substantially encapsulating the carbon fibers. In accordance with one or more aspects of this disclosure, the carbon matrix may include anisotropic carbon formed by carbonization (pyrolyzation) of pitch or resin, and isotropic carbon formed by pyrolyzing a liquid carbonizable precursor. The isotropic carbon formed may extend substantially throughout a volume of the carbon-carbon composite material. In some examples, the isotropic carbon may substantially fully (e.g., fully or nearly fully) encapsulate the anisotropic carbon, including outer surfaces of the carbon-carbon composite material.

In some examples, the liquid carbonizable precursor may be infused into a porous preform comprising carbon fibers or carbon fiber precursors, and the infused precursor may be subsequently pyrolyzed to form isotropic carbon in the preform. In some examples, the isotropic carbon may be porous. In other examples, the isotropic carbon may be substantially nonporous (e.g., nonporous or nearly nonporous). The isotropic carbon may at least partially encapsulate fibers of the porous preform. Thereafter, one or more VPI, PIC, and/or RTM densification steps may be performed to infiltrate the porous preform (including the porous isotropic carbon in examples in which the isotropic carbon is porous) with a densifying agent. After pyrolyzation of the densifying agent, VPI, PIC, and/or RTM may result in porous anisotropic carbon being formed within the porous preform. A final densification step using the liquid carbonizable precursor may be performed to densify the porous preform to a final density and form a carbon-carbon composite material.

Because the anisotropic carbon formed using VPI, PIC, and/or RTM is porous, the liquid carbonizable precursor may infiltrate the pores and, upon pyrolyzation, may form an isotropic carbon phase that extends substantially throughout the volume of the carbon-carbon composite, in intimate contact with the anisotropic carbon. In some examples, the isotropic carbon may substantially fully (e.g., fully or nearly fully) encapsulate the anisotropic carbon formed during the VPI, PIC, and/or RTM densification step(s). In some examples, at least some of the isotropic carbon formed during the second infiltration may connect to at least some of the isotropic carbon formed during the first infiltration step and bond all the carbon (both the isotropic and anisotropic carbon) in the carbon-carbon composite together.

In one example, the disclosure describes a method including infusing a liquid carbonizable precursor into a porous preform and pyrolyzing the infused liquid carbonizable precursor to convert the precursor to isotropic carbon. In some examples, the method also includes infusing a densifying agent into the porous preform including the isotropic carbon and pyrolyzing the densifying agent to form porous anisotropic carbon from the densifying agent. The method may further include infusing the liquid carbonizable precursor into the porous preform including porous anisotropic carbon and pyrolyzing the infused liquid carbonizable precursor to convert the precursor to isotropic carbon and form a carbon-carbon composite material.

In another example, the disclosure describes a carbon-carbon composite material including a plurality of carbon fibers and a carbon matrix substantially fully encapsulating the plurality of carbon fibers. In accordance with this example, the carbon matrix comprises anisotropic carbon formed by pyrolyzing a densifying agent, and isotropic carbon substantially fully encapsulating the anisotropic carbon.

In a further example, the disclosure describes a method including infusing at least one of a furfuryl alcohol, a furfuryl acetone, and a furfuryl alcohol anhydride into a porous preform comprising carbon fiber or a carbon fiber precursor and pyrolyzing the infused at least one of a furfuryl alcohol, a furfuryl acetone, and a furfuryl alcohol anhydride to convert the infused furfuryl alcohol to isotropic carbon and form a rigidized preform. Additionally, the method may include infusing a densifying agent into the rigidized preform and pyrolyzing the densifying agent to form porous anisotropic carbon within the rigidized preform. In accordance with this example, the method further includes infusing at least one of a furfuryl alcohol, a furfuryl acetone, and a furfuryl alcohol anhydride into the porous anisotropic carbon within the rigidized preform and pyrolyzing the infused furfuryl alcohol to convert the infused at least one of a furfuryl alcohol, a furfuryl acetone, and a furfuryl alcohol anhydride to isotropic carbon and form a carbon-carbon composite material, wherein the isotropic carbon substantially fully encapsulates the anisotropic carbon. In some examples, the method does not include any chemical vapor deposition/chemical vapor infiltration processes.

The details of one or more examples are set forth in the accompanying drawings and the description below. Other features, objects, and advantages of the disclosure will be apparent from the description and drawings, and from the claims.

DETAILED DESCRIPTION

Figure 1:
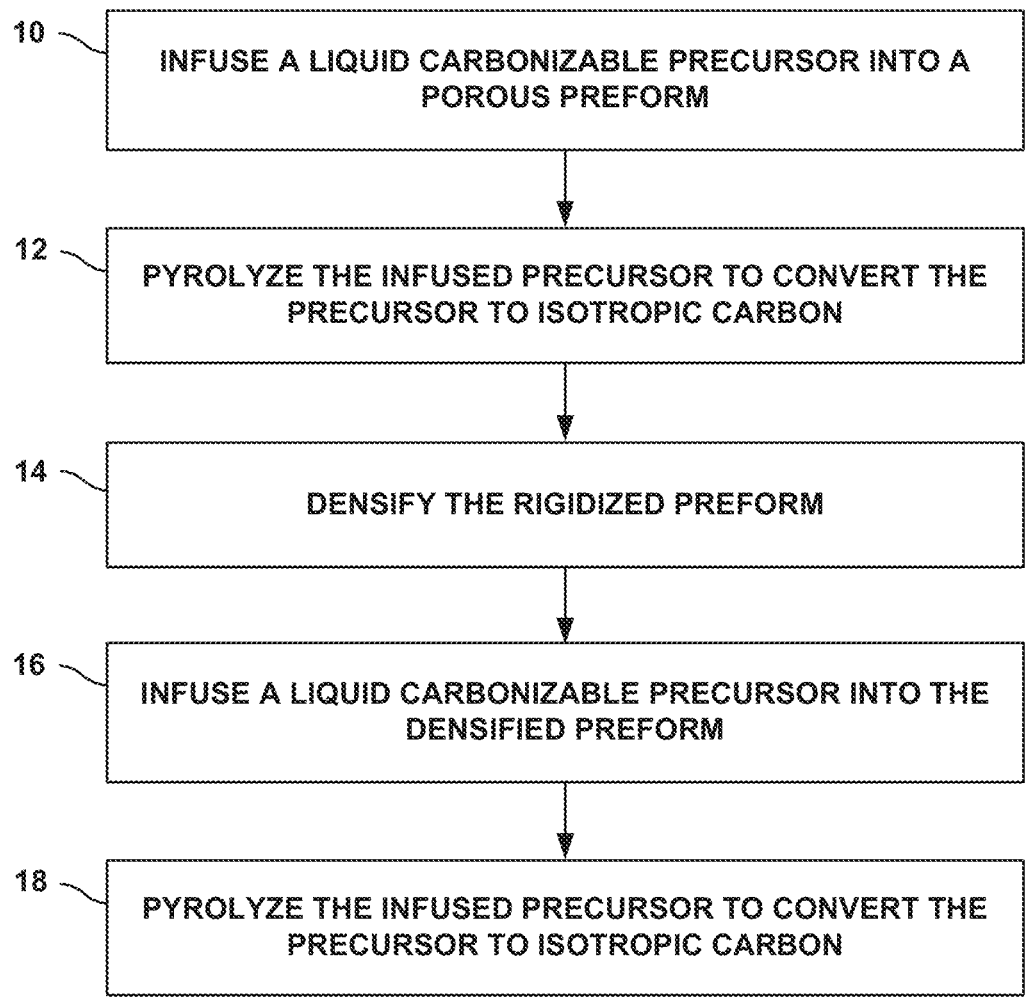
FIG. 1 is a flow diagram illustrating an example technique for forming a carbon-carbon composite body from a porous preform.

The present disclosure describes carbon-carbon composite materials and technique for forming carbon-carbon composite materials. In some examples, the carbon-carbon composite materials may include carbon fibers and a carbon matrix substantially encapsulating the carbon fibers. In accordance with one or more aspects of this disclosure, the carbon matrix may include anisotropic carbon formed by carbonization (pyrolyzation) of pitch or resin, and isotropic carbon formed by pyrolyzing a liquid carbonizable precursor. The isotropic carbon formed may extend substantially throughout a volume of the carbon-carbon composite material. In some examples, the isotropic carbon may substantially fully (e.g., fully or nearly fully) encapsulate the anisotropic carbon, including outer surfaces of the carbon-carbon composite material.

In some examples, the liquid carbonizable precursor may be infused into a porous preform comprising carbon fibers or carbon fiber precursors, and the infused precursor may be subsequently pyrolyzed to form isotropic carbon in the preform. The isotropic carbon may at least partially encapsulate fibers (e.g., carbon fibers) of the porous preform. In some examples, the isotropic carbon may be porous, while in other examples, the isotropic carbon may be substantially nonporous (e.g., nonporous or nearly nonporous). The isotropic carbon may provide enhanced structural strength and/or rigidity to the porous preform relative to the structure of the preform prior to the introduction of the liquid carbonizable precursor into the preform and the pyrolyzation of the liquid carbonizable precursor. A porous preform that has been rigidized by infusion and pyrolyzation of the liquid carbonizable precursor may be better able to withstand forces (e.g., shear forces) exerted on the preform by subsequent processing that might have otherwise compromised the integrity of the preform, such as by delaminating the preform.

Subsequently, one or more VPI, PIC, and/or RTM densification steps may be performed to infiltrate the porous preform (including pores of the porous isotropic carbon in examples in which the isotropic carbon is porous) with a densifying agent. Pyrolyzation of the densifying agent may result in porous anisotropic carbon being formed within pores of the porous preform. A final densification step using the liquid carbonizable precursor may be performed to density the carbon-carbon composite material to a final density.

Because the anisotropic carbon formed using VPI, PIC, and/or RTM is porous, the liquid carbonizable precursor may infiltrate the pores and, upon pyrolyzation, may form an isotropic carbon phase that extends substantially throughout a volume of the carbon-carbon composite material. In some examples, the isotropic carbon may substantially fully (e.g., fully or nearly fully) encapsulate the anisotropic carbon formed during the VPI, PIC, and/or RTM densification steps.

In some examples, the isotropic carbon may provide improved wear properties (e.g., strength) to the carbon-carbon composite material compared to carbon formed from pitch or resin, as the isotropic carbon may be more dimensionally stable than anisotropic carbon when exposed to changes in temperature. Thus, the isotropic carbon, which may form a substantially continuous porous structure within the carbon-carbon composite material due to the formation of isotropic carbon both before and after formation of the anisotropic carbon, may serve as a relatively dimensionally stable support structure within the carbon-carbon composite material. In some examples, at least some of the isotropic carbon formed during the second infiltration may connect to at least some of the isotropic carbon formed during the first infiltration step and bond all the carbon (both the isotropic and anisotropic carbon) in the carbon-carbon composite together.

Additionally, in some examples, using the liquid carbonizable precursor for the final densification step may allow densification of the porous preform without a CVD/CVI densification step. This may reduce a time required to form the carbon-carbon composite material, and may also reduce a cost of forming the carbon-carbon composite material, as CVD/CVI may require large capital investments and long processing times.

Figure 2:
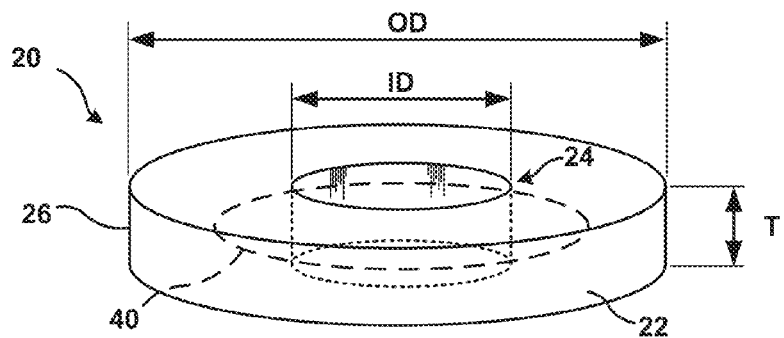
FIG. 2 is a perspective view of an example porous preform that may be used to form a carbon-carbon composite body.
Figure 3:
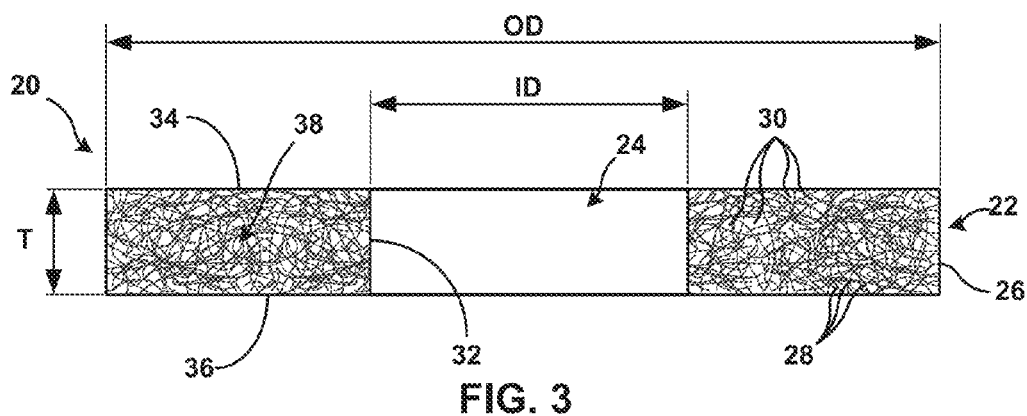
FIG. 3 is a lateral cross-sectional view of an example porous preform.

FIG. 1 is a flow diagram illustrating an example technique for forming a carbon-carbon composite body from a porous preform. The technique of FIG. 1 may be used to form a carbon-carbon composite material including carbon fibers, and anisotropic carbon phase, and an isotropic carbon phase that extends substantially throughout a volume of the carbon-carbon composite material. The technique of FIG. 1 will be described with reference to the conceptual diagrams of FIGS. 2-5, which show different views of an example porous preform at different times during the technique of FIG. 1 and a carbon-carbon composite material resulting from the technique of FIG. 1. Although an example porous preform 20 is depicted in FIGS. 2 and 3, the technique of FIG. 1 may be used with different preforms of other types (e.g., shapes or material compositions) and may be used to form carbon-carbon composites having different shapes or material compositions.

The technique of FIG. 1 includes infusing a liquid carbonizable precursor into a porous preform (10). FIG. 2 is a perspective view of an example porous preform 20 that may be used in the technique of FIG. 1. Examples of preforms that may be used as porous preform 20 include, but are not limited to: a fibrous preform, such as a woven fiber preform, a nonwoven fiber preform, a chopped-fiber and binder preform, a binder-treated random fiber preform, a carbon fiber preform, or a ceramic fiber preform; a foam preform; a porous carbon body preform; or a porous ceramic body preforms. In some examples, porous preform 20 includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In other examples, porous preform 20 does not include predefined layers, but, rather, can be formed from a bundle of fibers that are mechanically bound together, e.g., via needling. In other examples, a combination of any of the aforementioned types of preforms can be used.

In some examples, porous preform 20 may be formed using carbon fibers. In other examples, porous preform 20 may be formed using a carbon fiber precursor material, such as polyacrylonitrile (PAN) fibers, which are subsequently pyrolyzed to form carbon fibers. In some examples, the carbon fiber precursor material may be pyrolyzed before infusing a liquid carbonizable precursor into a porous preform (10). In other examples, the carbon fiber precursor material may not be pyrolyzed before infusing a liquid carbonizable precursor into a porous preform (10), and the carbon fiber precursor may be converted to carbon fiber when the infused carbonizable precursor is pyrolyzed to convert the infused carbonizable precursor to isotropic carbon (12).

In some examples, porous preform 20 may include isotropic carbon or a precursor material that converts to isotropic carbon when pyrolyzed. For example, PAN may convert to isotropic carbon when pyrolyzed.

In some examples, as shown in FIG. 2, porous preform 20 may have a generally disc-shaped geometry so that a carbon-carbon composite material formed from porous preform 20 may be generally disc-shaped, e.g., for use as a brake disc. In other examples, porous preform 20 may define a different geometry. For example, the geometry of porous preform 20 may be similar to or substantially the same as the desired geometry for the finished part formed by the carbon-carbon composite material.

Porous preform 20 comprises a disc-shaped porous body 22 with a central bore 24 extending through an axial thickness of disc-shaped porous body 22. In one example, porous preform 20 has an inner diameter ID at bore 24, an outer diameter OD at a radial edge 26, and an axial thickness T, which is measured in a direction substantially orthogonal to the direction in which inner diameter ID and outer diameter OD are measured.

FIG. 3 is a conceptual diagram illustrating a lateral cross-sectional view of an example of porous preform 20 shown in FIG. 2, which is taken along a diameter of porous preform 20. Porous body 22 of porous preform 20 may include, for example, a plurality of fibers 28 that define a plurality of pores 30 within porous body 22. The porosity of porous body 22 extends substantially throughout the thickness T of porous body 22. As described above, fibers 28 may be bound together by a binder, fibers 28 may be formed into a plurality of fibrous layers (not shown) that are bound or needle-punched together, or fibers 28 may be mechanically joined, e.g., using needle-punching, without previously being formed into distinct fibrous layers. Fibers 28 and pores 30 are not necessarily shown to scale, but rather are shown conceptually in order to illustrate aspects of the present disclosure.

In accordance with one or more aspects of the present disclosure, porous preform 20 may be infused with a liquid carbonizable precursor, which then may be pyrolyzed to form isotropic carbon. The isotropic carbon may at least partially encapsulate fibers 28, and may be porous or substantially nonporous. In some examples, the isotropic carbon may rigidize or stabilize porous preform 20 before further processing of porous preform 20, e.g., densifying porous preform 20 to form a carbon-carbon composite material.

In some examples, infusing the liquid carbonizable precursor into porous preform 20 (10) includes infusing the liquid carbonizable precursor at least to a predetermined depth within porous preform 20. As used herein, "predetermined depth" may refer to an absolute or relative depth from outer edges of preform body 22, such as from outer edge 26, from inner edge 32 (e.g., an inner edge 32 that defines bore 24), from upper edge 34, and from lower edge 36. In some examples, infusing the liquid carbonizable precursor into porous preform 20 (10) includes infusing the liquid carbonizable precursor to a relative depth of at least about 15% from the outer edges 26, 32, 34, 36 (e.g., at least about 15% of the difference between inner diameter ID and outer diameter OD from each of outer edge 26 and inner edge 32, and at least about 15% of thickness T from each of upper edge 34 and lower edge 36). In other examples, infusing the liquid carbonizable precursor into porous preform 20 (10) includes infusing the liquid carbonizable precursor to a relative depth of at least about 25% from outer edges 26, 32, 34, 36, such as at least about 30% from outer edges 26, 32, 34, 36; at least about 40% from outer edges 26, 32, 34, 36; or about at least about 45% from outer edges 26, 32, 34, 36.

In some examples, infusing the liquid carbonizable precursor into porous preform 20 (10) includes infusing the liquid carbonizable precursor may include infusing the liquid carbonizable precursor substantially throughout the entire porous preform body 22 so that an inner portion 38 of porous preform body 22 is substantially filled with the liquid carbonizable precursor. The term "inner portion" may refer to a generally geometrically-centered region within body 22, wherein the inner portion has a volume that is a predetermined percentage of the total volume of the preform, such as between about 15% and about 50% of the volume of the preform, such as between about 20% and about 30% of the volume of the preform.

As an example, for a generally annular preform, such as the example preform 20 shown in FIG. 2, a geometric center of preform body 22 will generally be an annulus 40 (FIG. 2) that is generally axially centered within porous preform body 22, e.g., generally centered within thickness T, and that is generally radially centered within porous preform body 22, e.g., generally centered between inner diameter ID at inner edge 32 and outer diameter OD at outer edge 26. By way of example, an "inner portion" may be defined as a predetermined percentage of the radius of porous preform body 22 on either side of center annulus 40, such as at least about 50% of the radius (e.g., at least about 25% of the radius of center annulus 40 on either side of center annulus 40), for example at least about 30% of the radius (e.g., at least about 15% of the radius on either side of center annulus 40), such as at least about 20% of the radius (e.g., at least about 10% of the radius on either side of center annulus 40), for example at least about 15% of the radius (e.g., at least about 7.5% of the radius on either side of center annulus 40). In another example, preform body 22 comprises a plurality of fibrous layers bonded, laminated, or needle-punched together, and inner portion 38 may comprise a predetermined number of inner layers of the plurality of layers on either side of a generally axially centered layer. In one example, the precursor is infused substantially throughout the entire porosity of porous body 22.

In some examples, the liquid carbonizable precursor may be infused into porous preform body 22 using vacuum pressure infiltration (VPI). VPI may include immersing porous preform body 22 in the liquid carbonizable precursor and subjecting porous preform 20 and the liquid carbonizable precursor to a vacuum, such that the liquid precursor wicks into porous preform body 22. In one example, vacuum infiltration may be performed at room temperature (e.g., between about 20° C. (about 68° F.) and about 25° C. (about 77° F.)). In another example, porous preform body 22 may be heated, e.g., up to a temperature of about 40° C. (about 105° F.), to aid infusion of the liquid carbonizable precursor into pores 20 within inner portion 38, or in some examples, throughout pores 30 of substantially the entire porous preform body 22.

In some examples, the liquid carbonizable precursor includes a material or materials with a viscosity that is sufficiently low so that the liquid carbonizable precursor may be infused substantially throughout the entire volume of porous preform body 22, e.g., so that the precursor is infused at least to a predetermined depth within preform 20 or so that the precursor is infused substantially into inner portion 38 of body 22. The precursor may be, for example, relatively non-viscous. In one example, the viscosity of the carbonizable precursor is between about 4 centipoise and about 100 centipoise, for example between about 4 centipoise and about 50 centipoise, such as about 4.5 centipoise.

In one example, the liquid carbonizable precursor may comprise a low-carbon yielding precursor, e.g., a precursor having a carbon yield when pyrolyzed of less than about 50%, for example about 30%. Low-carbon yielding precursors may have lower viscosities than relatively higher-carbon yielding precursors, such as medium-carbon yielding precursors or high-carbon yielding precursors, e.g., those having a carbon yield of at least 50%, for example at least about 90% or greater than 90% (e.g., 92%).

In some examples, the liquid carbonizable precursor may comprise one or more low-carbon yielding compounds, such as low-carbon yielding alcohols, for example furfuryl alcohol, furfuryl acetone, or furfuryl alcohol anhydride. In some examples, the liquid carbonizable precursor may include a material that forms an open cell carbon upon pyrolyzation.

Figure 4:
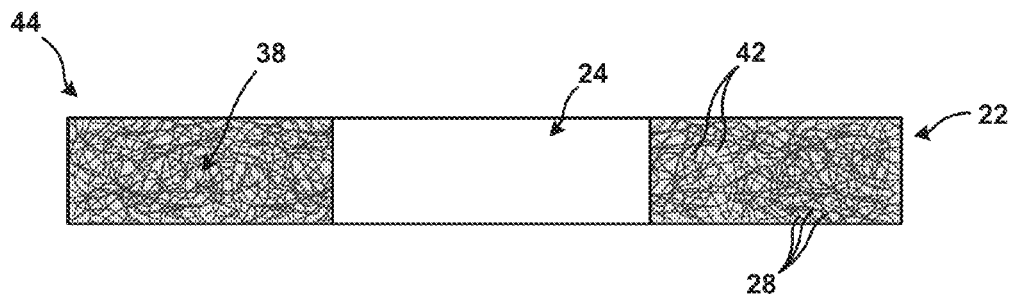
FIG. 4 is a lateral cross-sectional view of an example porous preform after infusing the preform with a precursor and pyrolyzing the precursor to rigidize the preform.

After infusing the liquid carbonizable precursor into porous preform body 22 (10), the technique of FIG. 1 includes pyrolyzing the liquid carbonizable preform to form isotropic carbon (12). In some examples, the isotropic carbon may enhance the rigidity and/or the stability of porous preform body 22. FIG. 4 shows the same cross-sectional view as in FIG. 3, but after the liquid carbonizable precursor has been infused into porous body 22 (10) and pyrolyzed to form isotropic carbon 42 within porous body 22 (12). In one example, isotropic carbon 42 is configured to enhance a rigidity of inner portion 38 of preform body 22.

In some examples, isotropic carbon 42 may be substantially nonporous, and may be formed as a coating or layer on fibers 28. Isotropic carbon 42 may at least partially encapsulate respective ones of fibers 28, and in some examples, may at least partially encapsulate a majority of fibers 28. In some examples, isotropic carbon 42 may substantially surround or encapsulate respective ones of fibers 28. For example, isotropic carbon 42 may substantially surround or encapsulate a majority of fibers 28.

In other examples, isotropic carbon 42 may be porous, and may be formed substantially throughout porous preform body 22. When isotropic carbon 42 is porous, isotropic carbon 42 may be formed on fibers 28, and may extend within pores 30 of preform body 22. In some examples in which porous preform body 22 comprises a plurality of fibers 28, porous isotropic carbon 42 may substantially surround a majority of fibers 28, and in some examples, porous isotropic carbon 42 may substantially surround substantially all of the plurality of fibers 28. However, in some examples, porous isotropic carbon 42 may not continuously coat fibers 28. Rather, after pyrolyzing porous preform body 22 and the liquid carbonizable precursor (12), porous isotropic carbon 42 that is formed within pores 30 may be in a noncontinuous layer on fibers 28, e.g., define a porous or cracked surface. The porous isotropic carbon 42 within pores 30 may be useful for increasing the surface area that is within pores 30, which can facilitate increasing the density of porous preform body 22 after a subsequent densification step, such as a VPI, RTM, or PIC densification step. For example, porous isotropic carbon 42 may define a surface to which resin or pitch from the subsequent densification step may attach. In this way, pores 30 may be partially filled with porous isotropic carbon 42 in a configuration that permits additional densification to take place.

Isotropic carbon 42 that is formed by pyrolyzing the infused carbonizable precursor is configured to bond to carbon or other densifying agents used in subsequent densification steps. In one example, isotropic carbon 42 that is formed by pyrolyzing the infused carbonizable precursor has an open cell structure in order to allow for the infusion of a densifying agent, such as a pitch (e.g., isotropic or mesophase pitch) or resin used in a RTM, VPI, or PIC processing step (described in more detail below), through rigidized preform 44 (e.g., through isotropic carbon 42 that is porous and substantially throughout preform body 22). In an open cell structure, openings of about 10 microns to about 250 microns are defined, although other sizes are contemplated. The size of pores 30 after formation of isotropic carbon 42 is selected such that the densifying agent can fill pores 30.

Rigidized preform 44, comprising preform 20 with a porous isotropic carbon 42 formed within pores 30 of preform body 22, has greater structural rigidity than non-rigidized preform 20 such that rigidized preform 44 may better withstand forces exerted on rigidized preform 44 by further processing that may compromise the integrity of rigidized preform 44, such as high-pressure RTM densification processing.

In some examples, as described above, fibers 28 may include isotropic carbon. In some such examples, porous isotropic carbon 42 may bond strongly to fibers 28.

In one example, the liquid carbonizable precursor may be pyrolyzed by heating the infused preform body 22 up to at least the charring temperature of the liquid carbonizable precursor. In some examples, the temperature at which the liquid carbonizable precursor is pyrolyzed may affect whether the isotropic carbon is porous or nonporous. For example, pyrolyzing the liquid carbonizable precursor at a higher temperature may lead to cracking of the isotropic carbon 42 during the pyrolysis procedure, resulting in porous carbon. In some examples, the infused preform body 12 may be heated to a temperature of between about 650° C. (about 1200° F.) and about 910° C. (about 1670° F.) to pyrolyze the liquid carbonizable precursor and form a substantially nonporous morphology. In other examples, 1600° C. (about 2900° F.) and about 2700° C. (about 4890° F.) to pyrolyze the liquid carbonizable precursor and form a porous morphology. In some examples, the infused porous preform 22 may be subjected to a relatively small pressure, for example between about 110 kilopascals (about 16 pounds per square inch (PSI)) and about 350 kilopascals (about 50 PSI). However pressurization may not be necessary in other examples.

After forming rigidized preform 44, such as by infusing (10) and pyrolyzing (12) a liquid carbonizable precursor in porous preform body 22, preform 44 may be further densified (14). For example, densifying rigidized preform 44 may include infusing rigidized preform 44 with a densifying agent and pyrolyzing the densifying agent. Example processes for infusing the densifying agent into rigidized preform 44 include RTM, VPI, or PIC.

Examples of densifying agents that may be used in an RTM, VPI, or PIC process include liquid resin or pitches (e.g., isotropic and/or mesophase pitches) that provide a relatively high carbon yield, e.g., of greater than about 80%, and may have a relatively high viscosity, such as synthetic mesophase pitches, coal-tar derived pitches, such as thermally or chemically treated coal tar, petroleum-derived pitches, synthetic-pitch derivatives, thermally treated pitches, catalytically converted pitches, and thermoset or thermoplastic resins, such as phenolic resins. In some examples, the carbon-carbon composite preform may be subjected to a sufficient number of densification steps to result in a density between about 1.5 g/cm$^3$ and about 1.85 g/cm$^3$.

In some examples of RTM, the carbon-carbon composite preform is placed into a mold matching the desired part geometry. Typically, a relatively low viscosity thermoset resin is injected at low temperature (50° C. to 150° C.) using pressure or induced under vacuum, into the porous carbon-carbon composite preform contained within a mold. The resin is cured within the mold before being removed from the mold.

In one example of an RTM process, the densifying agent, such as a resin or pitch, may be rapidly injected into mold 40, e.g., within between about 10 seconds and about 40 seconds, such as about between about 15 seconds and about 40 seconds, using an injection apparatus. In one example, the injection apparatus may comprise a heater extruder that melts a densifying agent feedstock, such as resin pellets, and feeds the liquid densifying agent to an accumulator. An injector, such as a piston, may drive the liquid densifying agent into mold 40 at a relatively high pressure and at a relatively high velocity. In one example, the injector may be configured to deliver the densifying agent to mold 40 at a pressure of between about 9 megapascals (about 1300 pounds per square inch (PSI)) and about 20.5 megapascals (about 3000 PSI), for example between about 12.4 megapascals (about 1800 PSI) and about 18.96 megapascals (about 2750 PSI), and may be configured to deliver substantially all of the melted densifying agent in the accumulator to mold 40 in between about 15 seconds and about 40 seconds, for example between about 18 seconds and about 25 seconds, such as between about 20 seconds and about 22 seconds. Further description of an example injection apparatus and method of using the apparatus is described in the commonly-assigned U.S. Pat. Nos. 6,537,470 and 7,172,408, the entire contents of which are incorporated herein by reference.

In some examples of VPI, the carbon-carbon composite preform is heated under inert conditions to well above the melting point of the impregnating pitch. Then, gas in the pores of the carbon-carbon composite preform is removed by evacuating the preform. Finally, molten pitch is allowed to infiltrate the pores of the preform, as the overall pressure is returned to one atmosphere or above. In the VPI process, a volume of resin or pitch is melted in one vessel while the porous carbon-carbon composite preform is contained in a second vessel under vacuum. The molten resin or pitch is transferred from vessel one into the porous preforms contained in the second vessel using a combination of vacuum and pressure. The VPI process typically employs resin and pitches which possess low to medium viscosity. Such pitches may provide lower carbon yields than mesophase pitches.

Regardless of the technique used to infuse the densifying agent, the densifying agent may infiltrate pores 30 of porous preform body 22. As pores 30 are at least partially filled with isotropic carbon 42 that is porous in some examples, the densifying agent also may infiltrate the pores of isotropic carbon 42, if present.

After injecting the densifying agent into rigidized preform 44, the densifying agent may be pyrolyzed to remove any non-carbon containing elements, which may convert the densifying agent infiltrated within preform 44 into a carbon-carbon composite. In one example, where a synthetic mesophase pitch is used, the pitch may be pyrolyzed using hot isostatic pressurization (HIP). In another example, the densifying agent may be stabilized by heating the densifying agent infiltrated preform 44 in an oxygen-containing environment to a temperature below the softening point of the densifying agent. The oxygen may react with the densifying agent to provide for cross-linking within the densifying agent. Once a suitable amount of oxygen has been absorbed and/or reacted into the densifying pitch, preform 44 may be heated to pyrolysis temperatures without melting the densifying agent or exuding any of the densifying agent from preform 44.

When the densifying agent is pyrolyzed, the densifying agent may form anisotropic carbon. Although the densifying agent may be a medium-to-high yielding carbon precursor, the resulting anisotropic carbon may still have some porosity. In some examples, the porosity may depend on the type of densifying agent, e.g., the type of carbon or resin. In some examples, at least some of the pores of the anisotropic carbon are open, e.g., in which at least some of the adjacent pores are connected. In examples in which isotropic carbon 42 is porous, at least some of the densifying agent infiltrates pores of isotropic carbon 42. Hence, porous isotropic carbon 42 may extend throughout at least a portion of the porous anisotropic carbon. Additionally, at least some of the isotropic carbon may be at least partially exposed by pores of the porous anisotropic carbon.

Although only a single densification step (14) is shown in FIG. 1, in some examples, the technique of FIG. 1 may include a plurality of densification steps (14). Each of the densification steps may be selected from RTM, VPI, and PIC, and the plurality of densification steps may include the same process or a different process. In some examples, additional densification steps (14) may further increase density of the densified preform.

Even after the plurality of densification steps (14), the densified preform may retain some porosity, which means that the densified preform may further densified. In the technique of FIG. 1, further densification of the densified preform is accomplished by infusing the liquid carbonizable precursor into pores of the densified preform, which may include pores of the porous anisotropic carbon and/or pores of the isotropic carbon 42, if present (16). In some examples, infusing the liquid carbonizable precursor into densified preform (10) includes infusing the liquid carbonizable precursor at least to a predetermined depth within the densified preform. As used herein, "predetermined depth" may refer to an absolute or relative depth from outer edges of preform body 22, such as from outer edge 26, from inner edge 32, from upper edge 34, and from lower edge 36. In some examples, infusing the liquid carbonizable precursor into the densified preform (16) includes infusing the liquid carbonizable precursor to a relative depth of at least about 15% from the outer edges 26, 32, 34, 36. In other examples, infusing the liquid carbonizable precursor into the densified preform (16) includes infusing the liquid carbonizable precursor to a relative depth of at least about 25% from outer edges 26, 32, 34, 36, such as at least about 30% from outer edges 26, 32, 34, 36; or at least about 40% from outer edges 26, 32, 34, 36; or about at least about 45% from outer edges 26, 32, 34, 36.

In some examples, infusing the liquid carbonizable precursor into the densified preform (16) includes infusing the liquid carbonizable precursor may include infusing the liquid carbonizable precursor substantially throughout the entire porous preform body 22 so that an inner portion 38 of porous preform body 22 is substantially filled with the liquid carbonizable precursor. The term "inner portion" may refer to a generally geometrically-centered region within body 22, wherein the inner portion has a volume that is a predetermined percentage of the total volume of the preform, such as between about 15% and about 50% of the volume of the preform, such as between about 20% and about 30% of the volume of the preform.

In some examples, the liquid carbonizable precursor may be infused into the densified preform using VPI. VPI may include immersing the densified preform in the liquid carbonizable precursor and subjecting the densified preform and the liquid carbonizable precursor to a vacuum, such that the liquid precursor wicks into the densified preform. In one example, vacuum infiltration may be performed at room temperature (e.g., between about 20° C. (about 68° F.) and about 25° C. (about 77° F.)). In another example, the densified preform may be heated, e.g., up to a temperature of about 40° C. (about 105° F.), to aid infusion of the liquid carbonizable precursor into pores within inner portion 38 of the densified preform, or in some examples, throughout pores of substantially the entire densified preform.

Once the liquid carbonizable precursor has been infused into pores of the densified preform (16), the liquid carbonizable precursor may be pyrolyzed to convert the precursor to isotropic carbon (18). In one example, the liquid carbonizable precursor may be pyrolyzed by heating the infused densified preform up to at least the charring temperature of the liquid carbonizable precursor. In one example, the infused densified preform may be heated to a temperature of between about 250° C. (about 480° F.) and about 810° C. (about 1490° F.), for example at least about 550° C. (about 1020° F.). In some examples, the infused densified preform may be subjected to a relatively small pressure, for example between about 110 kilopascals (about 16 pounds per square inch (PSI)) and about 350 kilopascals (about 50 PSI). However pressurization may not be necessary in other examples.

Figure 5:
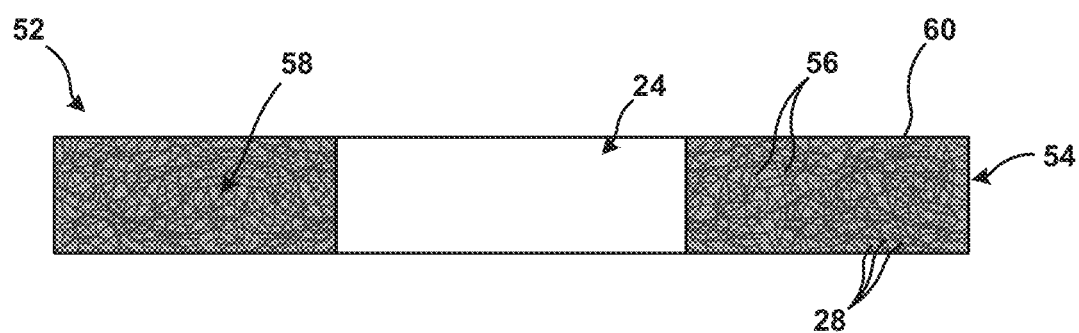
FIG. 5 is a lateral cross-sectional view of a portion of an example porous preform that includes a plurality of carbon fibers and a carbon matrix surrounding the plurality of carbon fibers.

Pyrolization of the liquid carbonizable precursor converts the liquid carbonizable precursor to isotropic carbon and forms a carbon-carbon composite 52, as shown in FIG. 5. FIG. 5 is a lateral cross-sectional view of a portion of an example porous preform that includes a plurality of carbon fibers and a carbon matrix surrounding the plurality of carbon fibers. The isotropic carbon at least partially fills pores of the porous anisotropic carbon, and may at least partially cover an external surface 60 of the carbon-carbon composite 52. As described above, porous isotropic carbon 42 may extend throughout at least a portion of the porous anisotropic carbon due to the initial formation of porous isotropic carbon 42 (e.g., prior to densification of rigidized preform 44 with the densifying agent). Due to the porosity of the anisotropic carbon, the subsequent infusion (16) and pyrolyzation (18) of the liquid carbonizable precursor may result in isotropic carbon extending throughout porous anisotropic carbon, e.g., from external surface 60 inward. Because at least some of the pores of the porous anisotropic carbon may open to isotropic carbon (e.g., of carbon fibers 28 or the porous isotropic carbon), in some examples, isotropic carbon may extend substantially throughout (e.g., throughout or nearly throughout) body 54 of carbon-carbon composite 52.

As described above, isotropic carbon may be more dimensionally stable than the anisotropic carbon under changes in temperature. Hence, in examples in which isotropic carbon extends substantially throughout body 54 of carbon-carbon composite 52, the isotropic carbon may provide improved wear properties (e.g., strength) to the carbon-carbon composite material compared to carbon formed from only pitch or resin. Thus, the isotropic carbon, which may form a substantially continuous (e.g., continuous or nearly continuous) phase within the carbon-carbon composite material, may serve as a relatively dimensionally stable support structure within the carbon-carbon composite material.

In some examples, isotropic carbon formed by pyrolyzation of the liquid carbonizable precursor before (12) and after (16) densifying the rigidized preform (14) may at least partially encapsulate the anisotropic carbon, and may substantially fully encapsulate (e.g., fully or nearly fully encapsulate). Because isotropic carbon is formed after densifying the rigidized preform (14), isotropic carbon may be present at outer surface 60 of carbon-carbon composite 52. Because the anisotropic carbon is porous and isotropic carbon was formed before densifying the rigidized preform (14), isotropic carbon may substantially surround domains of the anisotropic carbon. In examples in which isotropic carbon substantially fully encapsulates the anisotropic carbon, the isotropic carbon may be a relatively dimensionally stable support structure within the carbon-carbon composite material. Additionally, as isotropic carbon is present at outer surface 60 of the carbon-carbon composite 52, the isotropic carbon may be a friction modifier for carbon-carbon composite 52, e.g., may reduce a friction coefficient of surface outer 60 compared to when anisotropic carbon forms a majority of outer surface 60. However, this lower friction coefficient may be offset by using an increased braking pressure, due to the higher strength and better dimensional stability of isotropic carbon compared to anisotropic carbon.

Although not shown in FIG. 1, in some examples, the technique may further include a final heat treatment of carbon-carbon composite 52. The final heat treatment may include heating carbon-carbon composite 52 to a temperature between 1200° C. and about 2750° C. for up to about 3 days. In some examples in which a final heat treatment is performed, the final heat treatment may be performed at a temperature between about 1200° C. and about 1600° C., which may be lower than commonly used temperatures for chemical vapor deposition.

As shown in FIG. 1, the technique of forming carbon-carbon composite 52 does not include any CVD/CVI processes. By excluding CVD/CVI, the formation of carbon-carbon composite 52 may be less time consuming. Additionally, in some examples, the technique of FIG. 1 may include heat treatment steps (pyrolyzation and the final heat treatment) that are performed at temperatures less than temperatures used for CVD/CVI, and which may thus use less energy. Hence, the technique of FIG. 1 may produce carbon-carbon composite 52 at a lower cost and in less time than techniques that utilize at least one CVD/CVI step.

Various examples have been described. These and other examples are within the scope of the following claims.

What is claimed is:

1. A method comprising:
infusing a first liquid carbonizable precursor into a porous preform;
pyrolyzing the first liquid carbonizable precursor to convert the first liquid carbonizable precursor to porous isotropic carbon;
infusing a densifying agent into the porous preform including the porous isotropic carbon;
pyrolyzing the densifying agent to form porous anisotropic carbon from the densifying agent;
infusing a second liquid carbonizable precursor into the porous preform including the porous anisotropic carbon; and
pyrolyzing the second liquid carbonizable precursor to convert the second liquid carbonizable precursor to isotropic carbon and form a carbon-carbon composite material.

2. The method of claim 1, wherein infusing the densifying agent into the porous preform including the porous isotropic carbon comprises infusing the densifying agent into the porous preform including the porous isotropic carbon using at least one of resin transfer molding, vacuum pressure infiltration, and high pressure impregnation, wherein the porous isotropic carbon formed by pyrolyzing the first liquid carbonizable precursor in the porous preform provides sufficient rigidity to the porous preform to prevent delamination of the porous preform during the infusion of the densifying agent into the porous preform including the porous isotropic carbon.

3. The method of claim 2, wherein after pyrolyzing the second liquid carbonizable precursor to convert the second liquid carbonizable precursor to isotropic carbon and form a carbon-carbon composite material, isotropic carbon extends substantially throughout a volume of the carbon-carbon composite material.

4. The method of claim 2, wherein after pyrolyzing the second liquid carbonizable precursor to convert the second liquid carbonizable precursor to isotropic carbon and form a carbon-carbon composite material, the isotropic carbon substantially fully encapsulates the anisotropic carbon.

5. The method of claim 2, wherein the densifying agent comprises at least one of a high carbon yielding, high viscosity resin or pitch comprising at least one of a derivative of coal tar precursor, a derivative of a petroleum precursor, a derivative of a synthetic pitch precursor, a synthetic pitch, a coal tar pitch, a petroleum pitch, a mesophase pitch, or a high char-yield thermoset resin.

6. The method of claim 1, wherein the porous preform comprises one of a
woven fiber preform, a nonwoven fiber preform, a chopped-fiber and binder preform, a binder-treated random fiber preform, a carbon fiber preform, or a foam preform.

7. The method of claim 1, wherein the first and second liquid
carbonizable precursors comprise a low-carbon yielding precursor comprising at least one of furfuryl alcohol, furfuryl alcohol, and furfuryl alcohol anhydride.

8. The method of claim 1, wherein infusing the first liquid carbonizable precursor into the porous preform comprises immersing the porous preform in the first liquid carbonizable precursor in the presence of a vacuum.

9. The method of claim 1, wherein the method does not include a chemical vapor deposition/chemical vapor infiltration step.

10. A method comprising:
infusing a first carbonizable precursor comprising at least one of a furfuryl alcohol, a furfuryl acetone, and a furfuryl alcohol anhydride into a porous preform comprising carbon fiber or a carbon fiber precursor;
pyrolyzing the first carbonizable precursor to porous isotropic carbon and form a rigidized preform;
infusing a densifying agent into the rigidized preform;
pyrolyzing the densifying agent to form porous anisotropic carbon within the rigidized preform;
infusing a second carbonizable precursor comprising at least one of a furfuryl alcohol, a furfuryl acetone, and a furfuryl alcohol anhydride into the porous anisotropic carbon within the rigidized preform; and
pyrolyzing the second carbonizable precursor to isotropic carbon and form a carbon-carbon composite material, wherein the isotropic carbon extends substantially throughout the carbon-carbon composite material, and wherein the method does not include any chemical vapor deposition/chemical vapor infiltration processes.

11. The method of claim 10, wherein infusing the densifying agent into the rigidized preform comprises infusing the densifying agent into the rigidized preform using at least one of resin transfer molding, vacuum pressure infiltration, and high pressure impregnation.

12. The method of claim 10, wherein the densifying agent comprises at least one of a high carbon yielding, high viscosity resin or pitch comprising at least one of a derivative of coal tar precursor, a derivative of a petroleum precursor, a derivative of a synthetic pitch precursor, a synthetic pitch, a coal tar pitch, a petroleum pitch, a mesophase pitch, or a high char-yield thermoset resin.

13. The method of claim 10, wherein the porous preform comprises one of a woven fiber preform, a nonwoven fiber preform, a chopped-fiber and binder preform, a binder-treated random fiber preform, a carbon fiber preform, or a foam preform.

14. The method of claim 10, wherein after pyrolyzing the second carbonizable precursor to isotropic carbon and form a carbon-carbon composite material, isotropic carbon substantially fully encapsulates the anisotropic carbon.

* * * * *